Oct. 10, 1967   K. W. BROLING   3,346,223
COLLAPSIBLE FIFTH WHEEL STAND FOR PIGGY BACK TRAILERS
Filed Oct. 23, 1965   5 Sheets-Sheet 1

INVENTOR.
Keith W. Broling
BY *Hill, Sherman, Meroni, Gross & Simpson* ATTORNEYS United States Patent Office 3,346,223
Patented Oct. 10, 1967

3,346,223
COLLAPSIBLE FIFTH WHEEL STAND FOR
PIGGY BACK TRAILERS
Keith W. Broling, Homewood, Ill., assignor to Brandon Equipment Company Inc., Chicago, Ill., a corporation of Illinois
Filed Oct. 23, 1965, Ser. No. 503,066
18 Claims. (Cl. 248—119)

ABSTRACT OF THE DISCLOSURE

Collapsible fifth wheel stand for piggy back trailers having a bolster pivotally mounted on the top of an upright leg. The bolster has a king pin receiving slot therein and clamping jaws, clamping the king pin and locking the king pin in the slot. The upright leg is pivoted to a base plate and is braced in its upright position by a snubber link including cushioning means cushioning the upright leg and bolster against oppositely acting loads acting along the axis of the snubber link. A latching connection is provided to latch the upper end of the snubber link with the upper end portion of the upright leg. A trip lever is transversely pivoted to the upright leg and is operative to release the latching connection and accommodate the leg to fold downwardly along the link. A safety lock is provided for the trip lever while two locks are provided for the jaws to assure against accidental release of the trip lever and jaws. These levers and locks require three individual releasing operations.

---

This invention relates to improvements in collapsible fifth wheel stands for hitching piggy back trailers on railway cars.

A principal object of the present invention is to provide an improved form of collapsible fifth wheel stand for piggy back trailers, for hitching such trailers on railway cars, and arranged with a view toward utmost efficiency in construction and simplicity and safety in operation.

Another object of the invention is to improve upon the collapsible stands for hitching piggy back trailers on railway cars and the like, by so constructing the stand that it may be drawn to an upright position by the tractor placing the trailer on the railway car, in which a double locking arrangement is provided for the stand, to assure against accidental collapse of the stand.

It is a further object of the invention to provide a collapsible fifth wheel stand for trailers, supporting and hitching piggy back trailers to railway cars and the like, having a new and improved latching mechanism for maintaining the stand in its elevated position and clamping the king pin to the bolster of the stand.

A further object of the invention is to provide a fifth wheel stand particularly adapted for piggy back trailers, which may be raised and lowered by the motive power of the tractor for the trailer, and which is so arranged as to absorb all buff and draft forces on the trailer.

A still further object of the invention is to provide a novel form of fifth wheel stand for piggy back trailers, of an economical and efficient construction, which is convenient and safe to use, and is readily adapted to various flat cars and freight handling systems requiring a fifth wheel stand.

It is another object of the invention to provide an improved form of fifth wheel stand for piggy back trailers having a novel form of locking means for locking the king-pin to the stand in which the safety of the stand is enhanced by the requirement of more than one manual release operation for the locking means, to release the king pin and accommodate the stand to be retracted into a flat position along the deck of a flat car.

These and other objects of the invention will appear from time to time as the following specification proceeds and with reference to the accompanying drawings wherein.

Figure 1:
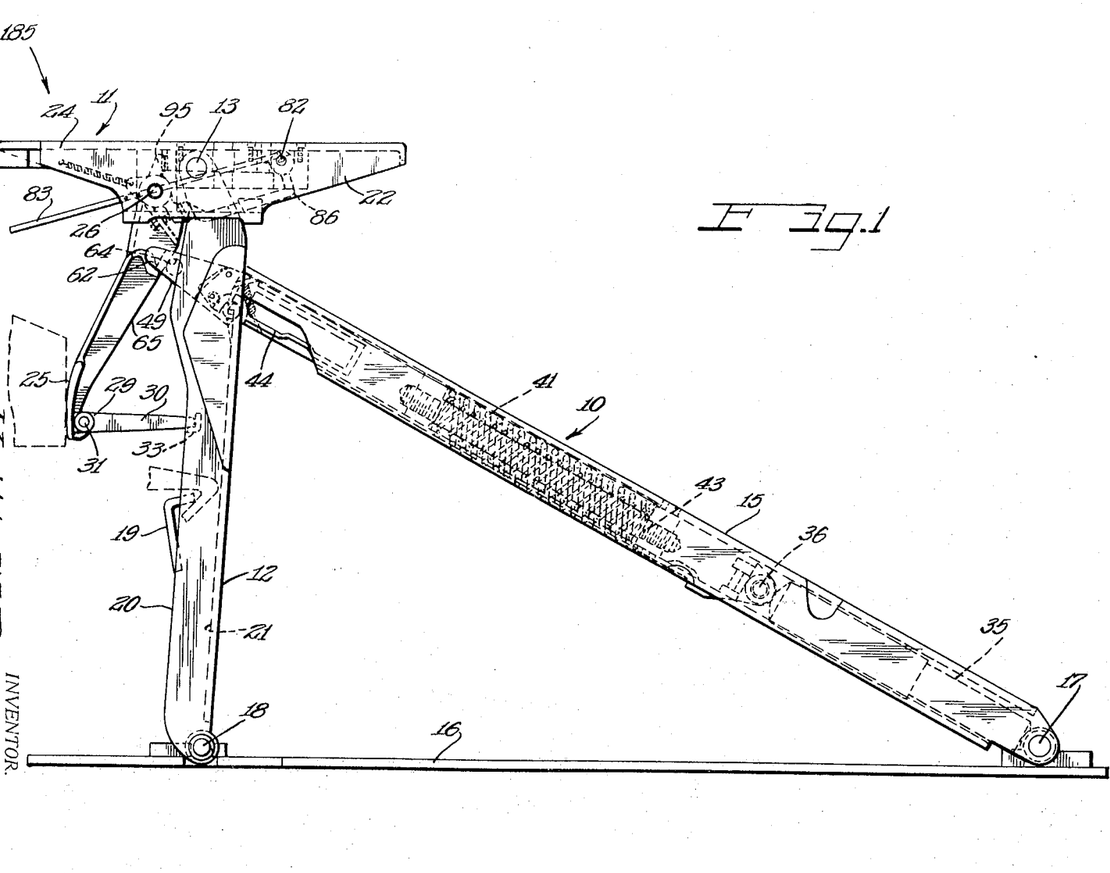
FIGURE 1 is a view in side elevation of a fifth wheel stand constructed in accordance with the principles of the present invention.
Figure 2:
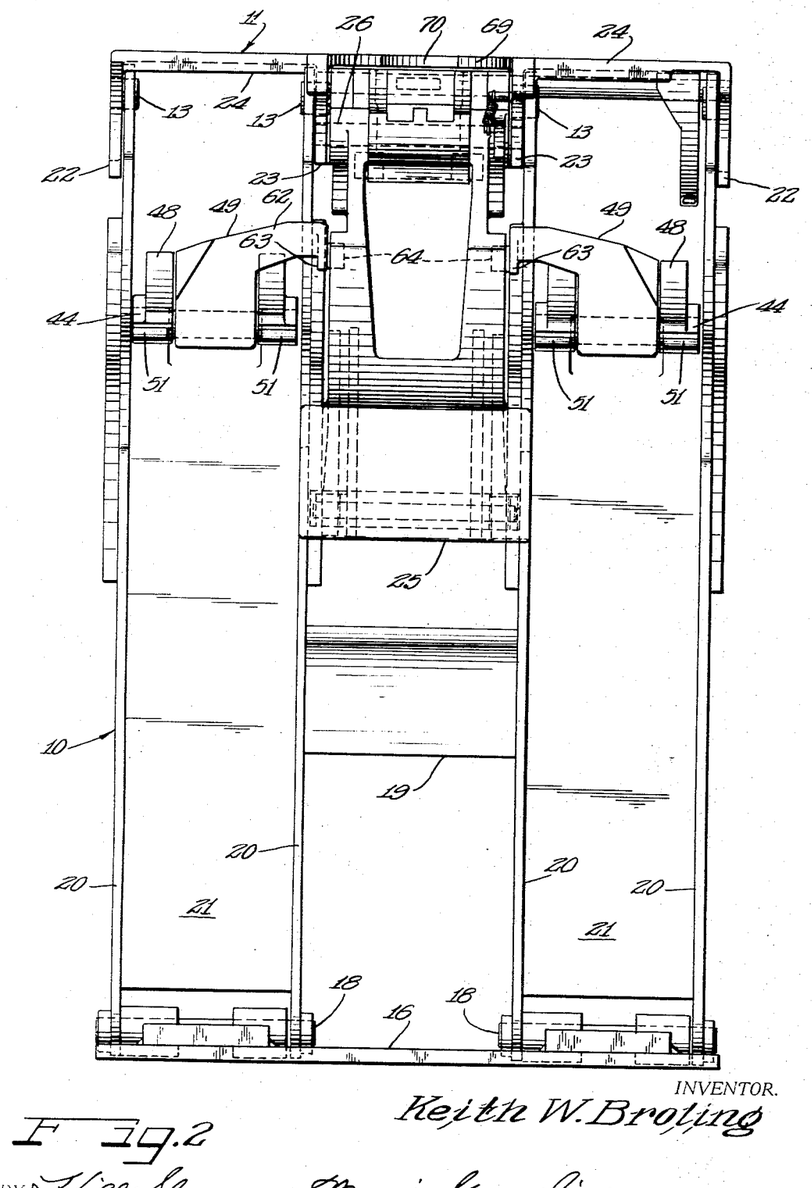
FIGURE 2 is a front end view of the stand shown in FIGURE 1.

In the embodiment of the invention illustrated in the drawings, I have shown in FIGURES 1 and 2 a collapsible fifth wheel stand 10 for mounting on the flat deck of a railway car and the like. The stand 10 includes a bolster 11 forming a support for the end of a trailer and a clamping means for the king pin thereof.

The bolster 11 is pivotally mounted on the upper ends of parallel spaced legs 12, 12 on transverse stub shafts or pivot pins 13, 13. The legs 12, 12 are held in an upright position by a pair of laterally spaced diagonal snubber links 15, 15, pivotally mounted at their lower ends on a base 16 on transverse pivot pins 17, 17. The legs 12, 12 are pivotally mounted on the base 16 on transverse pivot pins 18, 18 and are connected together intermediate their ends by an angle bar 19, extending therebetween and welded or otherwise secured thereto. The angle bar is adapted to be engaged by a hook on the end of a flexible cable (not shown) for drawing the legs 12, 12 in the upright positions shown in FIGURES 1 and 2.

Figure 3:
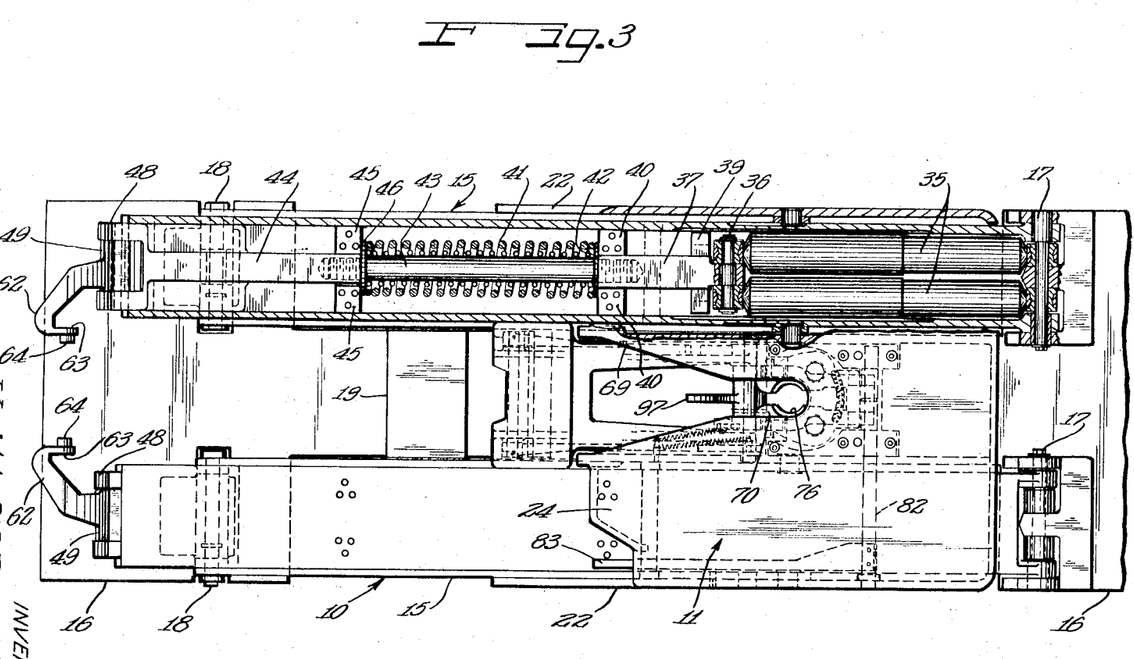
FIGURE 3 is a top plan view of the stand shown in FIGURES 1 and 2 showing the stand in its retracted folded condition along the deck of a railway car with certain parts shown in horizontal section and certain other parts broken away.
Figure 4:
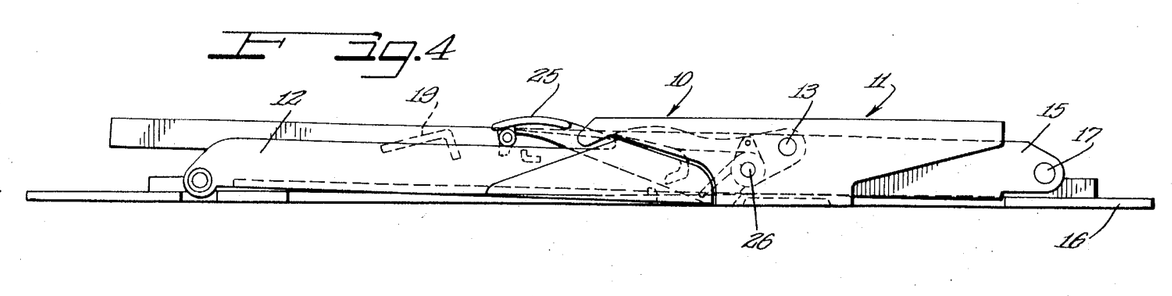
FIGURE 4 is a view in side elevation of the fifth wheel stand showing the stand in its retracted folded position.

The base 16 is shown as being in the form of a generally flat plate, adapted to be bolted or otherwise secured to the flat deck of a railway car to support the stand in an elevated operative position and accommodate the vertical legs 12, 12 to be folded downwardly and backwardly into engagement with the top surface thereof and the snubber links 15, 15 folded along the legs 12, 12, with the bolster 11 extending across the legs and links in a relatively flat condition along the top of the flat car, as shown in FIGURES 3 and 4.

Each leg 12 is shown in FIGURES 1 and 2 as including a pair of parallel spaced bars or plates 20, 20 connected together by a web 21 extending for a portion of the height thereof and terminating at the undersurface of the diagonal link 15 when the stand is in the upright position shown in FIGURE 1. The plates 20, 20 extend between a depending outer flange 22 and an inwardly spaced depending inner flange 23, depending from a flat support plate 24 of the bolster 11. The pivot pins 13, 13 are shown as being in the form of stub shafts and are mounted in the respective flanges 22 and 23 and extend inwardly therefrom.

Between the depending flanges 23, 23, is pivotally mounted a trip lever 25 on a pivot pin 26, mounted at its opposite ends in the flanges 23, 23 and extending across the space between said flanges. The pivot pin 26 is spaced forwardly and downwardly of the pivot pins 13, 13 and with the trip leved 25 serves to retain the bolster 11 in the generally horizontal king pin receiving position shown in FIGURE 1.

The lower end of the trip lever 25 has a pair of laterally spaced inwardly extending bosses 29, 29 formed integrally therewith and extending toward the associated legs 12, 12. The bosses 29 form pivotal mountings for safety levers 30, 30, pivotally mounted thereon on transverse pivot pins 31 and engageable with a stop 33, extending between the inner plates 20, 20 of the legs 12, 12 and welded or otherwise secured thereto at their ends. Thus when the legs 12, 12 are in their upright positions shown in FIGURE 1 and the safety levers 30, 30 are in engagement with the angle stops 33, 33 the trip lever 25 will hold the bolster 11 in the generally horizontal king pin receiving position shown in this figure. The safety levers 30 are engaged with the angle stops 33, 33 manually as the legs 12 are lifted into an upright position and held in this position by the diagonal snubber links 15, 15, as will now be described.

Each snubber link 15 is shown in FIGURES 1 and 3 as being of a generally hollow box-like form in cross section, housing a pair of snubbers 35 arranged in side-by-side relation with respect to each other and pivotally mounted at their lower ends on the pivot pin 17. A pivot pin 36 connects the opposite ends of said snubbers with a snubber link 37. The snubber link 37 has oppositely extending guide lugs 39 extending from opposite sides thereof having guiding engagement with the inside of the link 15. The snubber link 37 is also guided between two aligned stop blocks 40, 40 suitably secured to the link 15, and forming a stop for one end of two concentric springs 41. The concentric springs 41 are seated on a washer 42 engaging the snubber link 37 and encircling a tie rod 43, connecting the snubber link 37 with a lock link 44. The lock link 44 is guided between two spaced stop blocks 45, like the stop blocks 40, and is abutted by a washer 46 forming a seat for the opposite ends of the springs 41 from the washer 42. The springs 41 and snubbers 35 thus react in opposite directions and snub both the buff and draw forces on the bolster 11.

Figure 8:
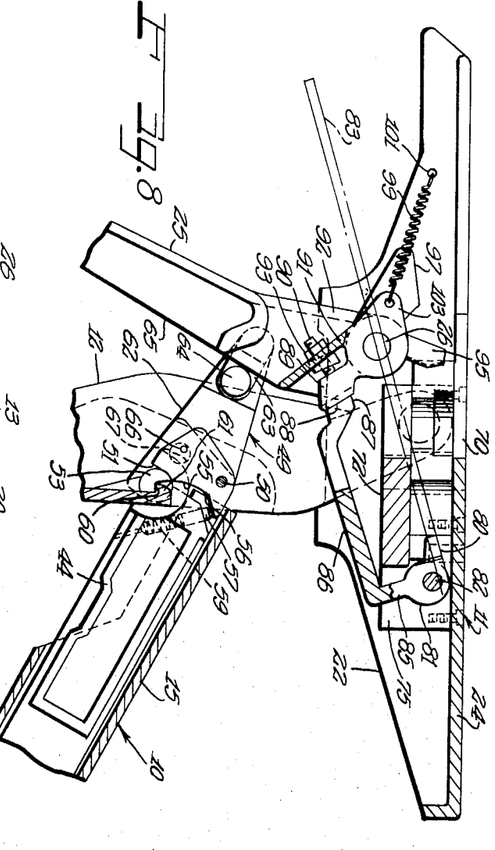
FIGURE 8 is an enlarged fragmentary side elevational view of the fifth wheel stand with certain parts broken away and certain other parts shown in vertical section in order to illustrate certain details of the locking means for the support leg of the stand and the release means therefor, and certain other details of the locking means for the clamping jaws, not shown in the previous figures.

The upper end of the lock link 44 is widened to be slidably guided within the link 15 and has a bifurcated upper end portion 48 extending beyond the end of said link. A trip arm 49 fits between the furcations of the bifurcated upper portion 48 of the lock link 44 and is pivotally mounted thereon as by a pivot pin 50 (FIGURE 8). The furcations and the bifurcated portion 48 of the lock link 44 have downwardly opening connectors 51 in the form of arcuate walled recessed portions formed integrally therewith, and engaging pins 53 extending inwardly of the side plates 20, 20 at the upper end portion of the web 22.

When the connectors 51 are in connecting engagement with the pins 53, 53, the leg 12 is maintained in its upright position shown in FIGURES 1, 2 and 8 and the springs 41 and snubbers 35, 35 will take the draw and buff loads on the bolster 11, the springs 41 serving to maintain the lock link in extended relation with respect to its link 15 and to maintain leg 12 in the upright position shown in FIGURE 1.

The trip arm 49 has an inner end portion disposed between the furcations of the bifurcated portion 48 of the lock link 44 having a recessed portion 55 facing the space between the furcations of the bifurcated portion 48 (FIGURE 8). The recessed portion 55 has an upper inclined face 56 engaging a spring pressed plunger 57, slidably guided in the lock link 44 and extending generally perpendicular to the face 56. A spring 59 seated in the lock link biases the plunger 57 outwardly with respect to said lock link and biases a dog 60 at the lower end of the recess 55 into engagement with a keeper 61, extending inwardly of the web 21 adjacent the upper end thereof and shown as being formed integrally therewith. The dog 60, biased into engagement with the keeper 61 by the plunger 57, thus locks the connectors 51 to the pins 53 and locks the diagonal snubber link 15 in position to hold the leg 12 in the upright position shown in FIGURES 1, 2 and 8.

Each trip lever 49 also has a forwardly and inwardly extending arm 62 extending toward the trip lever 25 and having a backwardly extending inner end portion 63 having a stop and follower lug 64 on the inner end thereof, extending inwardly under an inclined camming surface 65 of the trip lever 25. The lugs 64 hold the trip lever 25 in the extended position shown in FIGURES 1, 2 and 3. The camming surface 65 engaging the lugs 64 cams the trip lever 49 to pivot about the pivot pin 50 in a clockwise direction, upon inward movement of the trip lever 25, to release the dog 60 from the keeper 61 and accommodate the connectors 51 to be released from the pins 53 upon inward pressing movement on the trip lever 25.

Movement of the trip arm 49 is limited by a pin 66 extending outwardly of the trip lever into an aperture 67 formed in an outer furcation of the bifurcated portion 48 of the lock link 44.

Figure 6:
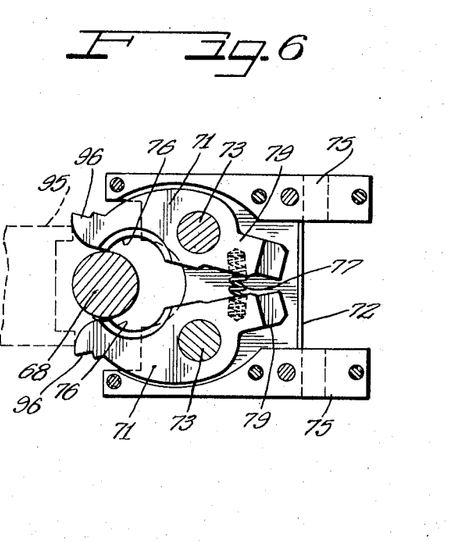
FIGURE 6 is a fragmentary detail view of the locking means for the king pin of a trailer, with the bolster plate removed and showing the king pin coming into a clamped position.

Referring now in particular to the bolster 11 and the means for clamping a king pin thereto and retaining the king pin to said bolster, during travel of the trailer on the railway car, the plate 24 has a converging forwardly opening slot 69 formed therein converging toward the relatively narrow slot 70 having parallel side walls and of a width substantially equal to the diameter of a king pin 68 (FIGURE 6). The converging slot 69 thus serves to guide the king pin to the slot 70, where the king pin may be misaligned with respect to said slot, when its trailer is placed on a railway car.

Figure 5:
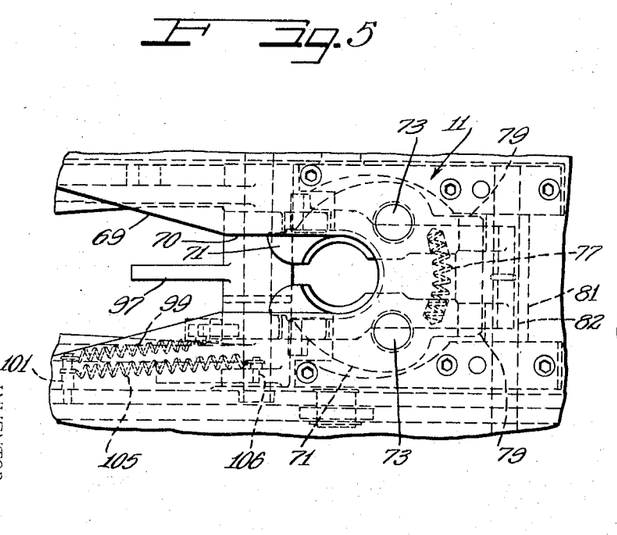
FIGURE 5 is an enlarged fragmentary plan view of a portion of the bolster of the fifth wheel stand and illustrating certain details of the locking means for the king pin of the trailer.

Beneath the plate 24 is a pair of clamping jaws 71 pivotally mounted between the undersurface of the plate 24 and a downwardly spaced plate 72 of the clamping jaw housing on pivot pins 73, 73. The plate 72 is spaced from the undersurface of the plate 24 by parallel spaced bars 75, 75 recessed to generally conform to the outer sides of the clamping jaws 71 when said jaws are in extended relation as a king pin is entering king pin receiving clamping recesses 76 of said jaws (FIGURE 6). The clamping jaws 71, 71 are biased into their clamping position shown in FIGURES 5 and 7 by a compression spring 77, spaced rearwardly of the clamping recesses 76 and seated within rearwardly extending arm portions 79 of the clamping jaws 71.

A means is provided to lock the clamping jaws 71, 71 into clamping engagement with a king pin, which is herein shown as comprising a lock lug 80 extending from a boss 81 secured to a rock shaft 82 and forming a clamp lock for the clamping jaws. The rock shaft 82 is rockably mounted in the bars 75, 75 and extends outwardly of one bar through an associated flange 23 and has an operating lever 83 secured thereto and extending angularly downwardly and forwardly therefrom.

The boss 81 also has an arm 85 extending radially therefrom in a downward direction, which terminates into a right angled forwardly extending arm 86 (FIGURE 8). The arm 86 has a bifurcated end portion the furcations of which terminate into abutment members 87 engaging laterally spaced abutment surfaces 88 of an abutment lever 89. The abutment lever 89 is pivoted on the transverse pivot pin 26 and extends angularly inwardly and downwardly therefrom along ledges 91, 91 extending inwardly of the inner plates 20, 20 of the legs 12, 12. The abutments 87 engaging the abutment surfaces 88 thus cooperate with the trip lever 25 to maintain the bolster 11 in its horizontal king pin receiving and clamping position. Movement of the abutment levers 89 is limited by threaded stops 90 extending through the angular ledges 91. The stop screw 90 may have a slotted outer end (not shown) and is retained in position on the ledge 91, as by a nut 93.

Figure 7:
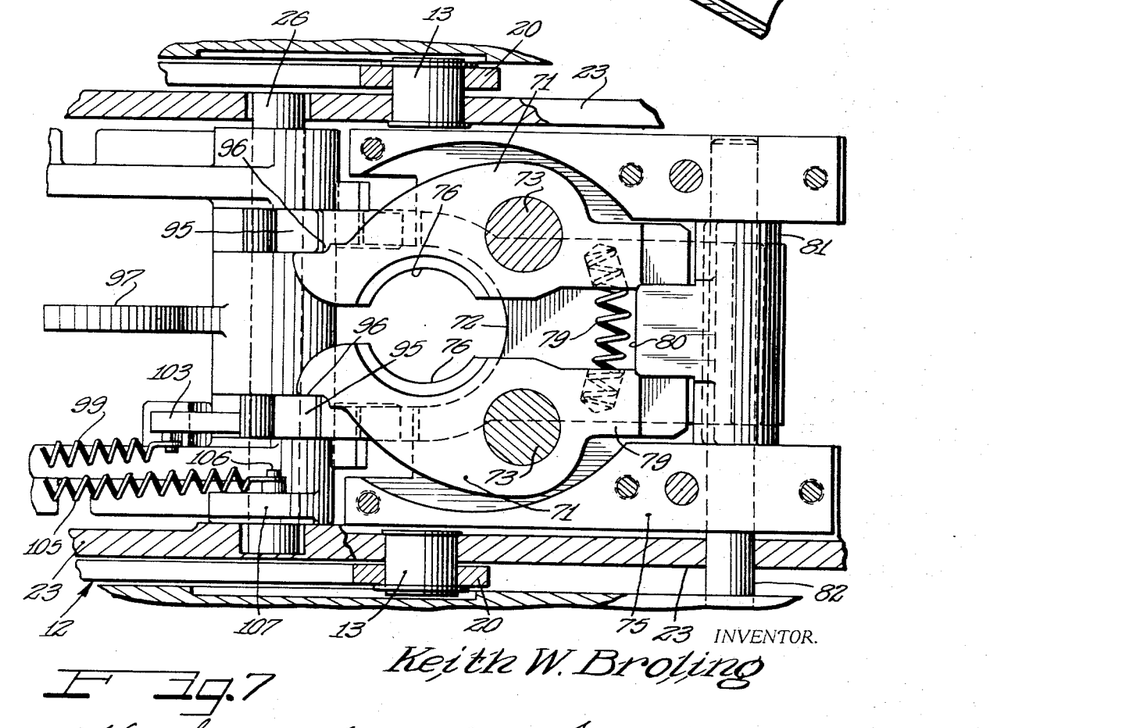
FIGURE 7 is an enlarged fragmentary plan view of a portion of the fifth wheel stand, with the bolster plate removed and certain parts shown in horizontal section in order to more clearly illustrate certain details of the locking means for the clamping jaws for the king pin.

Movement of the operating lever 83 in a counterclockwise direction will thus disengage the abutments 87 from the abutment surfaces 88 and move the locking lug 80 from the space between the arms 79, 79 out of locking engagement therewith. As the locking lug 80 is moved out of locking engagement with the arms 79, 79 of the clamping jaws 71, 71 to release said jaws, the jaws 71, 71 will still be maintained in their clamping positions by safety locking arms 95, 95 engaging along the outer faces of outwardly opening recesses 96 in the outer sides of the forward end portions of the clamping jaws 71 (FIGURE 7).

The safety locking arms 95 extend radially upwardly of the abutment lever 89 and may be manually released by operation of a forwardly extending hand lever 97, extending forwardly of the abutment lever 89. Movement of the hand lever 97 in a downward direction about the axis of the shaft 26 will thus release the clamping jaws 71 and accommodate the king pin 68 to cam said jaws against the spring 77 to their open king pin releasing positions shown in FIGURE 6. The safety locking levers 95, 95 thus form a safety lock assuring against unintentional release of the clamping jaws by operation of the operating lever 83 and making it necessary to perform two distinct manual operations to release the king pin 68 from the jaws 71. A tension spring 99 is connected between a pin 101 mounted in and extending inwardly of the inner depending flange 23 of the plate 24 of the bolster 11, and an arm 103 extending from the abutment lever 89 radially of the shaft 26. The tension spring 99 biases the safety lock arms 95 in the safety lock position shown in FIGURE 8.

A second tension spring 105 is connected from the pin 101 to the pin 106 extending inwardly of a lever arm 107 extending forwardly of the upper end portion of the trip lever 25 radially of the pivot pin 26. The tension spring 105 tends to return the trip arm 25 into the locking position shown in FIGURES 1 and 8.

When it is desired to extend the stand from the retracted position shown in FIGURES 3 and 4 to the extended upright position shown in FIGURES 1 and 2, the hook on the end of a flexible cable (not shown), attached to a winch (not shown) on the tractor, drawing the trailer to and from the railway car, may be hooked to the angle bar 19. The flexible cable may then be drawn in to pull the legs 12, 12 upwardly about the axis of the pivot shafts 18. The links 15, 15 extending along the top surfaces of the legs 12, 12 will also be pivoted upwardly, upon upward pivotal movement of the legs 12, 12. As the legs 12, 12 are moved upwardly the lock link will move into the space between the sides plates 20, 20 of said legs above the webs 21 thereof. As the legs 12, 12 reach their upright positions the downwardly opening connectors 51, 51 of the lock links 44 will drop into engaging position with the connector pins 53, 53. At the same time the spring pressed plunger 57 will snap the dog 60 under the keeper 61, to lock the diagonal snubber links 15, 15 to the legs 12, 12.

The safety lock levers 30, 30 may then be manually engaged with the angle stops 33, to hold the trip lever 25 in the position shown in FIGURE 1 and to hold the plate 24 of the bloster 11 into a generally horizontal king pin receiving position. A trailer may then be backed up to pass over the bolster 11 with its king pin 68 movable along the inwardly converging slot 69 in the plate 24 and into the king pin receiving inner end portion 70 thereof. The lever 83 may then be operated to release the lock lug 80 from the clamping jaws 71. Upon release of the lock lug 80, the safety lock levers 95 may be released by operation of the hand lever 97, to accommodate the king pin to claim the clamping jaws 71 to their open positions. As soon as the king pin comes into engagement with the clamping jaws 71, the lever 97 may be released. The safety lock levers 95 will then engage the curved end portions of said jaws. The compression spring biasing the clamping jaws toward their closed position will accommodate movement of the king pin into the king pin clamping recessed portions 76 of said clamping jaws. At the same time the safety lock levers 95 engaging the curved end portions of the jaws 71, 71 will be moved by the spring 99 in a clockwise direction into engagement with the recesses 96 on the outer forward end portions of said clamping jaws to lock the clamping jaws into clamping engagement with a king pin. The operating lever 83 may then be grasped and moved in a clockwise direction to bring the locking lugs 80 into the space between their rearwardly projecting arms 79 of the jaws 71 and positively clamp the jaws to the king pin. During movement of the operating lever 83 in a clockwise direction, the arm 86 and abutment ends 87 thereof will come into engagement with the abutment surfaces 88 of the abutment lever 89 to positively hold the plate 24 of the bloster 11 into the horizontal position shown in FIGURE 8. When in this position, adjustment of the bolster 11 may be attained, when necessary, by operation of the adjustment screws 90.

The king pin of the trailer is now positively locked to the bolster 11 and cannot be released until positive release movement of the operating lever 83 in a counterclockwise direction to move the clamping lug 80 out of the space between the arms 79 of the clamping jaws 71, and upon positive release of the safety lock arms 95 from the outwardly facing recesses 96 in the outer sides of the forward end portions of the clamping jaws 71.

Upon release of the king pin from the clamping jaws 71 and the drawing of the trailer from the railway car, when it is desired to store the stand, the safety levers 30 are released from the angle stops 33. The bumper of the tractor may then engage the trip lever 25 to release the dogs 60 from the keepers 61 and cam the trip arms 49 and connectors 51 of the lock links 44 out of engagement with the lock pins 53. Continued movement of the tractor will then cam the snubber links 15 above the tops of the webs 21 of the legs 12 and effect folding of the legs 12 along the base plate 16 and collapsing or folding of the arms 15 along the top surfaces of the legs 12 in the spaces between the plates 20, 20 thereof. The bolster 11 will then drop along the tops of the snubber links 15 along the outsides thereof with the trip lever extending in the space between the legs 12, as shown in FIGURE 4. The bolster has now been collapsed to a relatively flat compact position out of the way of trailers or other vehicles which may pass thereover.

It may be seen from the foregoing that I have provided a simple form of compact fifth wheel stand for hitching trailers to railway cars so constructed as to take the buff and draw forces on the trailers and arranged with a view toward utmost safety.

It may further be seen that safety is attained by making it necessary to first release the locking lug 80 from between the clamping jaws 71 by operation of the operating lever 83 and to then release the safety lock arms 95 from said clamping jaws and, that the stand then cannot be collapsed by the tractor until intentional release of the safety levers from the angle stops 33.

It may further be seen that the stand is universally adapted for use on a wide range of trailer and railway cars and that while the stand may be extended or collapsed by the tractor placing the trailer on the stand and removing the trailer from the stand, it need not necessarily be operated by the tractor, but may be extended or retracted manually if desired.

While I have herein shown and described one form in which the invention may be embodied, it may readily be understood that various variations and modifications in the invention may be attained without departing from the spirit and scope of the novel concepts thereof.

I claim as my invention:

1. A collapsible stand for a fifth wheel adapted for use on a railway car comprising:

a support leg transversely pivoted at one end to the car for upward movement into a vertical extended position and for lowering movement into a collapsed position, a bolster having a king pin receiving slot therein transversely pivoted to the opposite end of said leg, a snubber link transversely pivoted at one end for folding movement along said leg upon downward movement of said leg along the deck of the railway car, said snubber link having releasable engagement with the upper end portion of said leg and being telescopic and having oppositely acting snubber means extending therealong to take the buff and draw forces thereon, a trip lever transversely pivoted to said bolster in spaced relation with respect to the pivotal mounting of said bolster on said leg, releasable means retaining said trip lever in position to hold said bolster into a generally horizontal king pin receiving position, and an operative connection between said trip lever and said link operable upon release of said holding means, for releasing said link from said leg upon inward pushing movement on said trip lever, to fold said leg along the deck of the railway car and accommodate said link to be folded over said leg.

2. A collapsible stand for a fifth wheel adapted for use on a railway car comprising:

a support leg transversely pivoted at one end for upward movement into a vertical extended position and for lowering movement into a collapsed position along the deck of the railway car, a bolster having a king pin receiving slot therein, transversely pivoted to the opposite end of said leg intermediate the ends of said bolster, a snubber link transversely pivoted at one end for movement into an angular upward bracing position with said leg, and for downward folding movement along the top of said leg, and having snubber means extending therealong and taking the buff and draw forces on said bolster and support leg, an interlocking connection between said link and leg, holding said leg in an upright position and releasable to accommodate said leg and snubber link to fold downwardly toward and along each other, and a trip lever pivoted to said bolster and adapted to hold said bolster into a generally horizontal king pin engaging position, said trip lever being movable by inward pushing movement thereon to release said interlocking connection between said link and leg and to cam said link to pass along said leg to collapse said leg, link and bolster along the deck of a railway car.

3. A collapsible stand for a fifth wheel adapted for use on a railway car comprising:

a base for mounting on the flat deck of a railway car, a support leg transversely pivoted at one end to said base, a bolster having a king pin receiving slot therein and king pin clamping jaws vertically pivoted beneath the top surface thereof, means transversely pivoting said bolster to the opposite end of said leg, a link transversely pivoted to said base at one end for folding movement along said base and for movement ito an angular upwardly extending bracing position with said leg, said link having snubber means extending therealong and having an end portion having interlocking connection with said leg, holding said leg in an upright position, a trip lever pivoted to said bolster in spaced relation with respect to the pivot of said bolster to said leg, for holding said bolster in a horizontal position, a trip arm pivoted to the end of said link adjacent said interlocking connection for releasing said link from said leg, and a camming connection between said trip lever and said trip arm for moving said trip arm to release said link from said leg and accommodate said link to fold over and along said leg upon collapse thereof by inwardly pushing movement on said trip lever.

4. In a collapsible stand for a fifth wheel adapted for use on a railway car, a base, a support leg transversely pivoted at one end to said base, a bolster having a king pin receiving slot therein, transversely pivoted to the free end of said leg.

a foldable link transversely pivoted to said base at one end and having an opposite free end having a downwardly opening connector interengageable with said leg, for holding said leg in an upright position, a trip lever transversely pivoted to said bolster forwardly of the pivotal connection of said bolster to said leg, a releasable engaging connection between said trip lever and said leg, maintaining said bolster in a horizontal position, a trip arm transversely pivoted to the free end of said link and extending forwardly therefrom and having a latching dog having latching engagement with said leg for holding said connector in interengagement with said leg, and a camming connection between said trip lever and said trip arm releasing said latch upon inwardly pushing movement on said trip lever and camming said connector out of supporting engagement with said leg upon further inward pushing movement on said trip arm to effect the folding of said stand along said base.

5. In a collapsible stand for a fifth wheel adapted for use on a railway car, a base, a support leg transversely pivoted at one end to said base, a bolster having a king pin receiving slot therein transversely pivoted to the other end of said leg, a foldable link transversely pivoted at one end to said base in longitudinally spaced relation with respect to said leg, a lock link slidably extending from the free end of said foldable link and having a downwardly opening connector interengageable with said leg for holding said leg in an upright position, spring means maintaining said lock link in extended relation with respect to said foldable link and taking the buff and draw shocks on said bolster, a trip arm transversely pivoted to the free end of said lock link and extending forwardly thereon and having a latching dog on the rear end thereof having latching engagement with said leg, for holding said connector in interengagement with said leg, a trip lever transversely pivoted to said bolster forwardly of said leg, a releasable engaging connection between said trip lever and said bolster maintaining said bolster in a horizontal position, and a camming connection between said trip lever and said trip arm, camming said trip arm to release said dog from latching engagement with said leg and to release said connector from interengagement with said leg upon release of said releasable engaging connection and inward pushing movement on said trip arm.

6. A fifth wheel stand in accordance with claim 5,
wherein a snubber is carried by said foldable link and connected with said lock link to take the buff and draw forces on said bolster and leg in cooperation with said spring means.

7. In a collapsible stand for a fifth wheel adapted for use on a railway car,
a base,
a support leg transversely pivoted at one end to said base,
a bolster having a king pin receiving slot therein, transversely pivoted to the opposite end of said leg,
a foldable link transversely pivoted at one end to the opposite end of said base from said leg and having an opposite free end having a downwardly opening connector interengageable with said leg, for holding said leg in an upright positon,
a trip lever transversely pivoted to said bolster in forwardly spaced relation with respect to the pivotal mounting of said bolster on said leg,
a trip arm transversely pivoted to the free end of said foldable link and extending forwardly therefrom toward said trip lever and having a latch dog having latching engagement with said leg, for holding said connector in interengagement with said leg,
and a camming connection between said trip lever and said trip arm, maintaining said trip arm in position to hold said bolster in a generally horizontal king pin receiving position and operable upon inward pushing movement on said trip lever to release said latch dog from latching engagement with said leg and release said connector from said leg and accommodate downward folding movement of said leg, foldable link and bolster along said base into a generally retracted horizontal position upon continued pushing movement on said trip lever.

8. In a collapsible stand for a fifth wheel adapted for use on a railway car.
a base,
a support leg transversely pivoted at one end to said base,
a bolster having a king pin receiving slot therein, transversely pivoted to the opposite end of said leg,
a foldable link transversely pivoted at one end to the opposite end of said base from said link and having an opposite free end,
a lock link slidably mounted on the free end of said foldable link for extensible movement from the free end thereof and having a downwardly opening connector interengageable with said leg for holding said leg in an upright position,
spring means maintaining said lock link in extended relation with respect to said foldable link,
a trip lever transversely pivoted to said bolster in forwardly spaced relation with respect to said leg and depending from said bolster along said leg,
a trip arm transversely pivoted to said lock link and extending forwardly therefrom and having a latch dog having latching engagement with said leg for holding said connector in interengagement with said leg,
and a camming connection between said trip lever and said trip arm maintaining said trip lever in position to hold said bolster in a generally horizontal king pin receiving position and operable on inward pushing movement on said trip arm to release said latch dog from latching engagement with said leg and to cam said connector out of interengagement with said leg, upon continued inward pushing movement on said trip arm.

9. A collapsible stand for a fifth wheel in accordance with claim 8,
wherein a lever is provided to hold said trip lever from inward pushing movement toward said leg and is manually operable to release said trip lever and accommodate inward pushing movement of said trip arm to release the latch dog and release said connector from said leg, to effect the folding of said stand along said base.

10. A fifth wheel stand in accordance with claim 9,
wherein the lever is pivoted to said bolster at one end and has an opposite abutment end holding said trip lever from inward movement toward said leg.

11. A collapsible stand for a fifth wheel in accordance with claim 9,
wherein the lever is pivoted to said bolster and has releasable connection with said trip lever to hold said trip lever in extended relation with respect to said leg and to hold said bolster in a generally horizontal king pin receiving position,
wherein a manually operable operating lever is provided for operating said lever and
wherein a safety lever is transversely pivoted to the lower end of said trip arm and is manually positionable into engagement with said leg,
whereby release of said safety lever and operation of said operating lever are required to condition said trip lever to collapse said stand upon inward pushing movement thereon.

12. A collapsible stand for a fifth wheel adapted for use on a railway car and in combination with a railway car,
a base,
a support leg transversely pivoted to said base,
a foldable snubbing link transversely pivoted to said base in longitudinally spaced relation with respect to said leg,
a releasable locking connection between said snubbing link and said leg,
a bolster transversely pivoted to the upper end of said support leg and having a forwardly opening converging king pin receiving slot therein,
a pair of clamping jaws pivotally mounted on opposite sides of said slot and beneath the top of said bolster for movement into clamping engagement with a king pin in said slot,
spring means biasing said clamping jaws into a clamping position,
a clamp lock pivoted to said bolster for holding said clamping jaws in clamping engagement with a king pin,
a trip lever transversely pivoted to said bolster in forwardly spaced relation with respect to the pivotal mounting of said bolster on said leg,
an arm extending from said clamp lock toward said trip lever and having an abutment face on the end thereof holding said trip lever in extended relation with respect to said leg and holding said bolster in a generally horizontal king pin receiving position,
and manually operable means for releasing said clamp lock and pivoting said arm to release said abutment face and accommodating the removal of a king pin from said clamping jaws and the folding of said stand along said base.

13. A collapsible stand for a fifth wheel adapted for use on a railway car and in combination with a railway car, comprising:
a base,
a support leg transversely pivoted to said base,
a foldable snubbing link transveresly pivoted to said base in longitudinally spaced relation with respect to said support leg,
a releasable locking connection between said snubbing link and said leg for holding said leg in an upright support position, a bolster transversely pivoted to the upper end of said leg and having a forwardly opening converging king pin receiving slot, clamping jaws pivoted to said bolster beneath the top thereof on opposite sides of said slot for movement toward and from said slot, spring means biasing said clamping jaws into position to engage a king pin, a clamp lock transversely pivoted to said bolster for holding said jaws in clamping engagement with the king pin and the like, a trip lever transversely pivoted to said bolster forwardly of the pivot of said clamp lock and the axis of pivotal mounting of said bolster to said leg, a lever arm extending from said clamp lock toward said trip lever and having an abutment face on the end thereof holding said trip lever in extended relation with respect to said leg, and thereby holding said bolster in a horizontal king pin receiving position, an operating lever manually operable to release said clamp lock and said abutment face to accommodate inward pivotal movement of said trip lever, and a camming connection between said trip lever and said locking connection between said snubber link and said leg for releasing said locking connection to effect folding of said stand along said base.

14. A fifth wheel stand in accordance with claim 13, wherein a safety lever is pivoted to the lower end of said trip lever and is manually positionable to engage said leg to retain said trip lever in extended relation with respect to said leg, whereby both said operating lever and safety lever must be moved to release positions to accommodate inward movement of said trip arm to release said locking connection and effect folding of said stand along said base.

15. A collapsible stand for a fifth wheel adapted for use on a railway car and in combination with a railway car, comprising:

a base, a support leg transversely pivoted to said base, a foldable snubbing link transversely pivoted to said base in longitudinally spaced relation with respect to said support leg, a lock link carried by said snubbing link for slidable movement with respect thereto, spring means maintaining said lock link in extended relation with respect to said snubbing link, a downwardly opening connector on said lock link engageable with said leg for locking said leg in an upright position, a trip arm transversely pivoted to said lock link and extending in advance thereof, a locking dog on said trip arm having locking engagement with said leg for retaining said connector in locking engagement with said leg, a bolster transversely pivoted to said support leg at the upper end thereof and having a forwardly opening converging king pin receiving slot therein, clamping jaws pivoted to said bolster beneath the top thereof on opposite sides of said slot for movement into registry with said slot for clamping a king pin in position on said bolster, spring means biasing said clamping jaws into position to engage a king pin in said slot, a clamp lock pivoted to said bolster for holding said clamping jaws in locked relation with respect to a king pin, a trip lever pivoted to said bolster in forwardly spaced relation with respect to the pivot of said clamp lock and the pivotal mounting of said bolster on said leg, a camming connection between said trip lever and said trip arm maintaining said trip lever in extended relation with respect to said leg and operable upon inward pushing movement on said trip lever to release said latching dog and effect the camming of said connector out of engagement with said leg, an arm extending from said clamp lock toward said trip lever and having a forwardly facing abutment face positively holding said trip lever in extended relation with respect to said leg, an operating lever for said clamp lock, arm and abutment face, for releasing said clamp lock and moving said abutment face out of holding relation with said trip lever, to accommodate collapse of said stand by release engagement of said trip lever by a tractor and the like.

16. A fifth wheel stand in accordance with claim 15, wherein a safety lever is pivoted to the lower end of said trip lever and is manually positionable to engage said leg to hold said trip lever in extended relation with respect to said leg, whereby collapse of said stand is attained by release of said safety lever and operation of said operating lever to release said clamp lock and abutment face by inward pushing movement on said trip lever by a tractor and the like.

17. A collapsible stand for a fifth wheel in accordance with claim 15, wherein a locking lever is pivoted to said bolster in forwardly spaced relation with respect to said clamp lock for locking engagement with said clamping jaws, wherein the locking lever has an abutment arm extending along said trip lever and abutted thereby, and wherein said abutment arm forms an abutment for said abutment face on said arm extending from said clamp lock, to retain said bolster in a horizontal position and to retain said trip lever in extended relation with respect to said leg.

18. A collapsible stand for a fifth wheel in accordance with claim 17, wherein a safety lever is pivoted to the lower end of said trip lever and is manually positionable to engage said leg to serve as a safety lock and prevent accidental collapse of said bolster.

References Cited

UNITED STATES PATENTS

| | | | |
|---|---|---|---|
| 3,050,320 | 8/1962 | Clejan | 287—20 |
| 3,183,853 | 5/1965 | Terlecky et al. | 248—119 X |
| 3,225,707 | 12/1965 | Rollins et al. | 248—119 X |
| 3,234,893 | 2/1966 | Sweda | 248—119 X |
| 3,252,432 | 5/1966 | Hartzell | 248—119 X |

ROY D. FRAZIER, *Primary Examiner.*

R. P. SEITTER, *Assistant Examiner.*